United States Patent [19]

Nicol

[11] 3,730,967

[45] May 1, 1973

[54] CRYOGENIC SYSTEM INCLUDING HYBRID SUPERCONDUCTORS

[75] Inventor: James Nicol, Dover, Mass.

[73] Assignee: Air Reduction Company, Incorporated, New York, N.Y.

[22] Filed: May 13, 1970

[21] Appl. No.: 36,739

[52] U.S. Cl. ...........174/15 C, 174/126 CP, 174/128, 174/DIG. 6, 335/216

[51] Int. Cl. ...............................H01b 7/34, H01b 5/10

[58] Field of Search .........................174/DIG. 6, 15 C, 174/126 CP, 128; 335/216; 333/99 S

[56] References Cited

UNITED STATES PATENTS

| | | | |
|---|---|---|---|
| 3,504,105 | 3/1970 | Bogner et al. | 174/126 |
| 3,428,926 | 2/1969 | Bogner et al. | 335/216 |
| 3,331,041 | 7/1967 | Bogner | 335/216 |
| 3,365,538 | 1/1968 | Voigt | 174/128 |
| 3,514,850 | 6/1970 | Barber et al. | 174/DIG. 6 |

FOREIGN PATENTS OR APPLICATIONS

| | | | |
|---|---|---|---|
| 1,096,535 | 12/1967 | Great Britain | 174/DIG. 6 |

*Primary Examiner*—Laramie E. Askin
*Assistant Examiner*—A. T. Grimley
*Attorney*—Melford F. Tietze, Edmund W. Bopp and Hume Mathews

[57] ABSTRACT

One or more superconducting strands are separated from a matrix of normally conducting material by a high resistance barrier layer of german silver. This may take the form of a cylindrical shell of german silver, either partly or completely enclosing a core comprising one or more strands of superconducting material, or a composite of superconducting and normally conducting strands. The barrier may comprise a german silver layer sandwiched between a pair of layers of normally conducting material, such as copper. An alternative embodiment comprises a matrix of copper or other low resistance metal in which are embedded superconducting strands in a substantially parallel array separated by laminae of german silver. After correduction, and twisting, superconductor wires, or composites, formed to include german silver barrier layers, may be used as superconducting coils in cryogenic systems.

23 Claims, 14 Drawing Figures

INVENTOR
J. NICOL
BY

ATTORNEY

INVENTOR
J. NICOL
BY
Milford F. Pitze [signature]
ATTORNEY

CRYOGENIC SYSTEM INCLUDING HYBRID SUPERCONDUCTORS

BACKGROUND OF THE INVENTION

As is well known, superconducting materials are roughly classified into two general types. Type I superconducting materials, when cooled below their critical temperature, exclude magnetic flux in all fields up to a critical value of field strength beyond which flux completely penetrates the sample, thereby destroying the superconducting state and causing the normal state to reappear. Those superconducting materials known as "Type II", or hard superconductors, completely exclude magnetic flux up to the lower end of a critical range of field strength, within which range a gradual penetration of flux takes place, until the upper limit of the range is reached, at which the flux penetration becomes complete, destroying superconductivity. Within this critical range in Type II superconducting materials, various techniques have been employed to avoid what is known as "flux jumping", such as by reducing the width of the superconducting strands, and forming composites of filamentary strands embedded in matrices of normally conducting material. However, the short sample performance of these composite conductors continues to be impaired by losses due to eddy currents. These are believed to be caused by increasing field strength, which generates lateral voltages in the composite. These give rise to current loops which extend laterally through normally conducting layers from one superconducting strand to the next, and which extend a theoretical length $l_c$ along the composite conductor.

It has been found in the prior art that it is possible to substantially reduce such losses in composite conductors containing multiple superconducting strands by employing various techniques to break up or reduce these eddy current loops, such as by twisting the composite conductor at a pitch which is substantially less than the critical length $l_c$, and also, by interposing between one or more of the superconducting strands a high resistance barrier layer. The criterion of the theoretical length $l_c$ and the interposition of a high resistance barrier layer is discussed in a letter entitled "The Effect of Twist on AC Loss and Stability in Multistrand Superconducting Composites," R.R. Critchlow, B. Zeitlin, and E. Gregory, Applied Physics Letters, Vol. 15, No. 7, Oct. 1, 1969. The foregoing letter refers to the priorart use of cupronickel as a suitable material for high resistance barrier layers in stranded superconductor composites. However, the ferro-magnetic character of cupro nickel makes it less than optimum for applications comprising high strength magnetic fields.

It has been found, in accordance with the present invention, that when barrier layers comprising thin shells of a high resistance paramagnetic alloy known in the art as german silver (nickel silver) are interposed into a matrix comprising normal conductive material and superconducting filaments of "Type II" materials, the susceptibility of the material to degradation of the current densities due to eddy currents is substantially reduced. As herein disclosed, such a barrier layer of german silver may take numerous forms. It may be applied as an annular cylindrical coating to a core element comprising a solid type II superconductor wire, or a composite of superconducting and normal material. The german silver coating may only partially surround the superconducting core; or, in another alternative form, it may surround the core in overlapping fashion. In accordance with a particular modification, the german silver coating or barrier layer may be sandwiched between a pair of layers comprising low resistance, normally conducting material, such as copper or aluminum. The german silver barrier layer need not be applied to the superconducting wire directly as a coating, but in another alternative embodiment, may take the form of laminae layers interposed between one or more rows of superconducting strands embedded in a matrix of normally conducting material.

Superconducting elements of any of the foregoing forms are reduced up to about 90 percent in cross-sectional area by various types of cold and hot working well known in the art. They are then preferably twisted, in accordance with well known practice to further form wire products which may be used in coils of cryogenic magnetic systems which are operated at temperatures below the critical temperature of the composite. When the coil in such a system is connected to a source of power, current flows superconductively. Thus, the coil may be operated as a super magnet, or for various other types of well known superconducting applications. Because of the low losses due to eddy currents, superconducting wire formed in accordance with the teachings of the present invention is particularly suited for use in pulsed synchrotron magnets.

One technique for utilizing superconducting wire including a german silver barrier layer, in accordance with the present invention, is to interpose twisted wires or rods coated with a layer of german silver, or sandwich layers of german silver, between layers of low resistance, normally conducting metal, in a slotted slab of normally conducting material. The latter is formed into a tube in the manner disclosed in application Ser. No. 36,741 filed at even date herewith by W. Marancik, W. Shattes, and B. Kirk. This is reduced by cold working to form a hollow conductor which may be ultimately cooled in a forced helium system, of which it forms a part.

The principal advantages for the use of a german silver barrier layer in combination with Type II superconductors is that in addition to having a high resistivity, it has a very low magnetic permeability in the low temperature range within which the superconductors operate.

Other objects, features, and advantages of the present invention will be apparent from the detailed description hereinafter with reference to the drawings.

BRIEF DESCRIPTION OF THE DRAWINGS

Referring to FIG. 1 of the drawings, there is shown a rod or wire 1 of superconducting material having a coating 2 of high resistance, normally conducting material which, in accordance with the present invention, is german silver.

Figure 1:
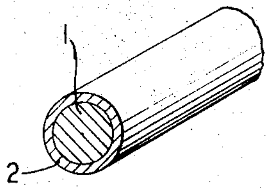
FIG. 1 shows a rod or wire of superconducting material encased in a coating of german silver, in accordance with the present invention.

For the purposes of the present invention, the superconducting material may comprise, for example, an alloy ranging in composition from 60 percent niobium, 40 percent titanium to 40 percent niobium, 60 percent titanium. In the present illustrative embodiment, the superconductor material is an alloy of niobium titanium consisting essentially of 55 weight per cent niobium and 45 weight per cent titanium. This is formed from what is known in the art as electron beam niobium and crystal bar titanium, the total alloy containing oxygen to the amount of about 200–1000 parts per million, the remaining impurities, not including oxygen, being under about 0.11 per cent by weight. It will be understood that in the fabrication of alternative embodiments, other alloys can be employed in different proportions of niobium and titanium, such as, for example, an alloy consisting essentially of 44 weight per cent niobium and 56 weight per cent titanium, having an oxygen content of about 600 parts per million and having impurities, not including oxygen, of less than about 0.15 per cent by weight. Moreover, it is contemplated that any material known as a Class II or "hard" superconductor, may be used for the purposes of the present invention.

As used herein, the term "german silver", or alternatively "nickel silver" refers to a class of alloys consisting primarily of copper, nickel and zinc, which may include small amounts of other additives to produce desired physical characteristics, such as ductility, malleability, tensile strength, corrosion resistance, machinability, etc. The general class of alloys under consideration include weight percentages within the following ranges:

| | Weight Per Cent |
|---|---|
| Copper | 55–72% |
| Nickel | 8–18% |
| Zinc | 29–10% |

In addition, they may include small percentages of the following additives: lead, iron and manganese.

Initially, a coating 2 of german silver, of one of the compositions indicated above, is plated to a thickness of, say, 15 mils, onto a rod 1 of superconducting material, which may be of any of the types indicated above, such as a ¼ inch diameter rod of 55 weight per cent niobium and 45 weight per cent titanium. The plating process is carried out by any of the techniques well known in the art, such as, for example, forcing the rod of superconducting material into a tube of german silver of the requisite thickness, say, 30 mils, and obtaining the desired bond by heating and cold working; or alternatively, by applying the coating by vacuum deposition in a manner well known in the art.

Another alternative is what is known in the art as "-sink drawing". This is achieved by placing the ¼ inch superconductor core element in an axial position in an oversized german silver tube which may be, for example, one-half inch or more in outer diameter, and about 15 mils thick. This is then crimped down onto the core element by a cold working process, in such a manner as to form good mechanical, thermal and electrical contact with the latter.

The composite formed by any of the foregoing processes is then cold worked through one or more dies until a product results in which the diameter of the superconductor core element is between about 6 mils and 1 mil, and the coating is substantially less than 1 mil in thickness. The wire structure formed by cold working, may be as much as 1200 feet in length. The final cross-sectional shape of the composite may be either round or rectangular, depending on the type of die through which it is drawn in the final processing steps.

Figure 2:
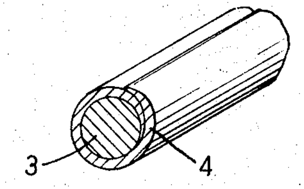
FIG. 2 is a modification of the showing of FIG. 1, in which the German silver coating layer is slightly overlapped in spiral fashion on the superconductor rod.

It will be apparent that the german silver coating need not be a closed annulus, such as shown in FIG. 1, but may take alternative forms, such as shown in FIG. 2, in which the superconducting core element 3, which is similar in composition to the core 1 of FIG. 1, is wrapped about in spiral form with a german silver coating layer 4, say, 15 mils thick, which is partially overlapping.

Figure 3:
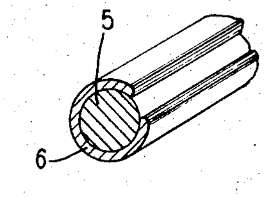
FIG. 3 is a modification of the invention in which the annular german silver layer is not completely closed.

On the other hand, it is not necessary for the coating to be completely closed about the superconducting core element, as shown in FIG. 3. There, the german silver coating element 6 only partially surrounds the core element 5, leaving an opening at the top which may be, for example, as much as one-eighth inch across in the initial structure prior to reduction, after which it is reduced proportionately.

Figure 4:
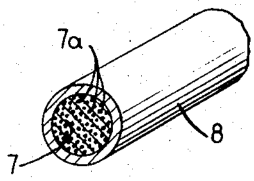
FIG. 4 is a modification of the invention in which the core element is a rod or wire comprising a matrix of normally conducting material containing strands of superconductor material, in which the rod has a coating of german silver.

In accordance with a further alternative, the core element, instead of consisting essentially of superconducting material, may comprise a prereduced matrix of low resistance, normally conducting material containing a large number of superconducting filaments, as indicated in FIG. 4 of the drawings. The core element 7, which may be, say, one-fourth inch in diameter, may contain a large number of strands *7a*, say up to 100, of superconducting material, each strand having a cross-sectional dimension of, say, 4 to 5 mils.

This product may be fabricated by any one of several different processes well known in the art. For example, a plurality of superconducting rods inserted in low resistance, normally conducting tubes, are packed together with or without additional rods of low resistance, normally conducting material in a preselected configuration inside of a cylindrical shell of normally conducting material several inches in diameter. This is then evacuated and sealed. The evacuated, sealed billet is then processed by a combination of hot and cold working steps to a product of desired cross-sectional dimension and electrical characteristics. Such a process is described in detail on page 46 of a book entitled *Manufacture and Properties of Steel Wires* by Anton Pomp, published by The Wire Industry, Ltd., London (1954).

The german silver coating 8, which in the present example is about 15 mils thick, is applied to the composite super-conductor core element 7 in the same manner as indicated with reference to FIG. 1. Also, it will be understood that the variants shown in FIGS. 2 and 3 of the drawing can also be employed, using a composite core element such as the core 7 of FIG. 4. All of the aforesaid are reduced up to 100 per cent in cross section by hot and/or cold working techniques in the manner previously described.

Figure 5:
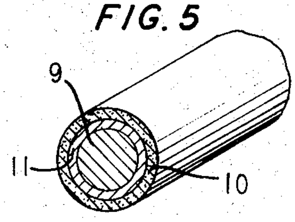
FIG. 5 is a modification of the combination of FIG. 1 having an added outer coating of a low resistance, normally conducting metal.
Figure 6:
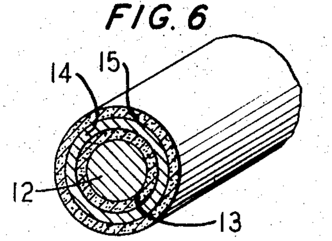
FIG. 6 is a further modification in which the german silver coating layer is sandwiched between a pair of layers of low resistance, normally conducting metal.
Figure 7:
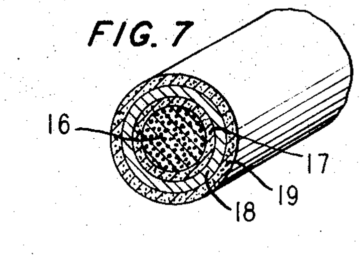
FIG. 7 is a modification of the combination of FIG. 6 in which the core element comprises strands of superconducting material in a normal conducting matrix.

Further modifications are shown in FIGS. 5, 6, and 7 of the drawings. In FIG. 5, a superconductor core element 9, which may initially take the form of a rod, say, one fourth inch in diameter, as in the case of the previous embodiments, is first coated with an under layer of german silver 11, say, 15 mils thick; and is ultimately coated with an outer layer of low resistance, normally conducting material 10, such as copper or aluminum, which may be, initially, say, between about 4 and 10 mils thick. This is reduced by hot and/or cold working techniques to a wire of the desired cross-section, which may be under 10 mils in over-all cross-section.

As indicated in FIG. 6, the superconducting core element 12 about one fourth inch in diameter, may be coated with a sandwich of layers comprising an under layer 13 of low resistance, normally conducting material, such as copper or aluminum, about 4 to 10 mils thick, superposed on which is an intermediate layer 14 of german silver which may be, say, 15 mils thick, followed by an outer layer 15 of low resistance, normally conducting material, which may also be between 4 and 10 mils thick, initially. As shown in FIG. 7, a further variation of the combination of FIG. 6 is had by substituting a composite 16 of superconducting and normal material similar to the element 7 of FIG. 4, for the solid superconducting rod of FIG. 6. This is then coated with sandwich layers, as in the latter, the under layer 17 being of copper or aluminum, the intermediate layer 18 being of german silver, and the outer layer 19 being of copper or aluminum, the thickness being of the order previously described with reference to FIG. 6. Both of the aforesaid are reduced by hot and/or cold working techniques to wire having an overall cross-section under 10 mils.

Figure 8:
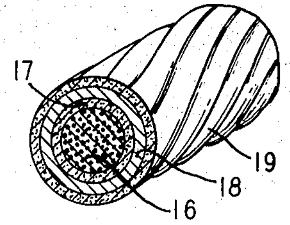
FIG. 8 is a modification of FIG. 7 in which the final wire product is twisted.

In accordance with FIG. 8, a combination such as shown in FIGS. 6 or 7, having an inner superconducting core 16, coated with a low resistance, normally conducting coating 17, a german silver coating 18, and an outer coating of low resistance, normally conducting material 19, is twisted.

The pitch of the twists which serves to reduce the losses due to eddy currents is preferably much less than a critical length $l_c$ (typically of the order of 0.3 $l_c$), where $l_c$ is determined in accordance with formula (1) referred to in the letter by Critchlow, Zeitlin, and Gregory, Supra.

$$l_c \cong 10^8 \lambda J_c d \rho / \dot{H} \quad (1)$$

where:

$l_c$ (cm.) = finite conductor length occupied by transverse eddy current;

$\lambda$ = empirical space factor, less than unity;

$J_c$ (A/cm$^2$) = current density of transverse current;

$\pi$ (ohms/cm.) = matrix resistivity;

$\dot{H}$ (gauss/sec.) = time-rate of rise of field strength;

It is also contemplated, in addition, that in preferred form, each of the rods or wires disclosed in FIGS. 1 through 6 is twisted in the manner indicated in FIG. 8, and at a pitch to be derived by substitution in the foregoing formula. It will be apparent that the higher the factor $\pi$ (the resistivity of the matrix), the longer will be the critical length $l_c$ which determines the pitch of the twist. Thus, since the german silver barrier layer provides a high matrix resistivity, the twist pitch of the wire is more relaxed, making fabrication simpler, and making lower losses possible.

Figure 9:
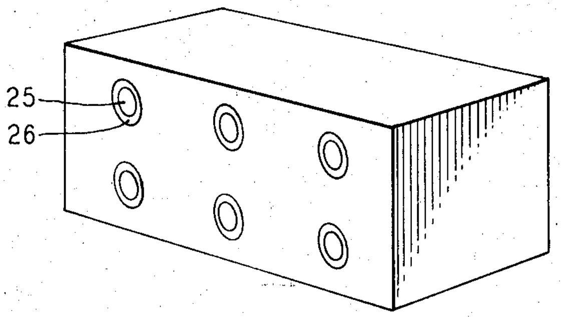
FIG. 9 shows a matrix of low resistance, normally conducting material containing interposed rods or wires of superconductor material coated with german silver.

Furthermore, wires of any of the types described with reference to FIGS. 1–7 (preferably twisted) may be mounted in a patterned arrangement, as indicated in FIG. 9, in a matrix of low resistance, normally conducting material, such as copper. This may be achieved, for example, by boring holes in the requisite positions in the copper block and forcing in the composite superconducting wires which have been treated in the manner indicated in any of FIGS. 1–8, inclusive. The billet so formed is then coreduced by hot and/or cold working techniques, in the manner previously indicated, to wire of the desired cross-section.

Figure 10:
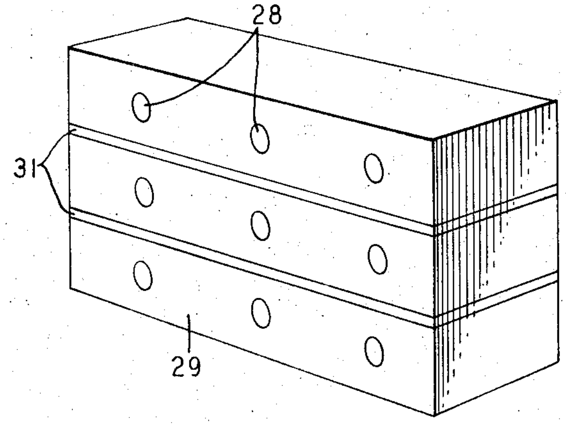
FIG. 10 is a matrix of normally conducting material containing interposed rods or wires of superconducting material in a preselected pattern, separated by laminae of german silver.

As a further alternative indicated in FIG. 10, holes drilled in requisite positions in a block 29 of low resistance, normally conducting material, such as copper, may each be fitted with uncoated rods 28 of superconducting material. For example, superconducting rods of niobium titanium, about one fourth inch in diameter, are spaced in rows one half inch apart in a horizontal plane and one half inch apart in a vertical plane. Laminae of german silver may be interposed between layers or groups of layers of the superconducting rods, thus providing barrier layers. In the present embodiment, layers of german silver, say, ⅛ inch thick, are interposed in horizontal planes halfway between each pair of horizontal rows of superconducting rods. The blocks shown in FIGS. 9 and 10 are reduced by cold working, in the manner previously indicated, to produce wire or ribbon having a cross-sectional dimension of, say, .060 inch in which the strands of superconducting material have a final cross-section of about 3 mils, and the german silver laminae have a final cross-sectional dimension of, say, 1.5 mils.

In accordance with a further embodiment of the invention, elements 33 of the form of any of those shown and described with reference to FIGS. 1–7 described hereinbefore, including coatings of german silver, and preferably twisted as shown with reference to FIG. 8, may be interposed, as shown in FIG. 11, into a series of longitudinal slots 34 which are, say, 0.05 inch wide and 0.07 inch deep, parallel to the long edges of a rectangular slab 27 of low resistance, normally conductive material, such as copper, say, 2 inches wide and 1 inch thick, and of indeterminate length.

Figures 11A, 11B, 11C:
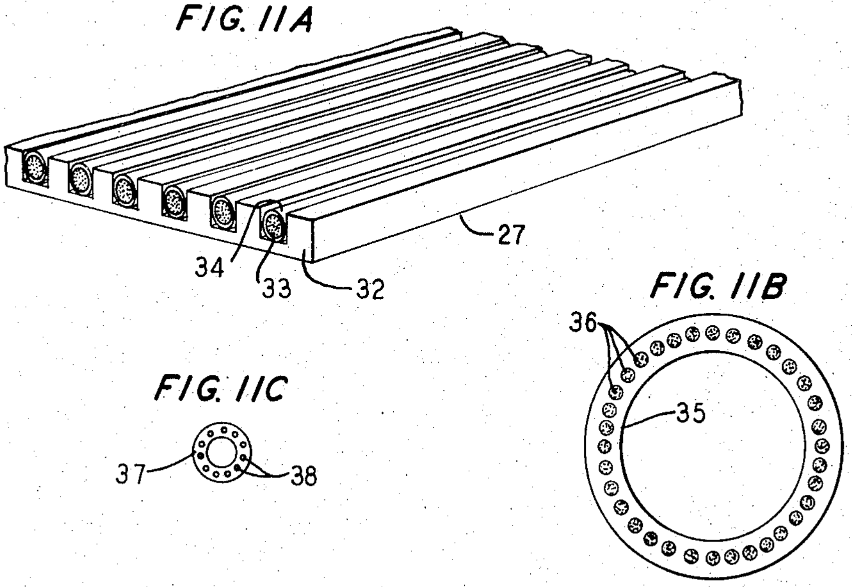
FIG. 11A shows a slab of normally conducting material including longitudinal slots into which are interposed twisted rods of any of the forms indicated in FIGS. 1 through 8.
FIG. 11B shows, before reduction, a tube made from a slotted slab of the form of FIG. 11a by standard tube processes.
FIG. 11C shows the configuration of FIG. 11B after reduction.

This matrix is cold worked and rolled to a thickness of 0.080 inch and a length of about, say, 1200 feet. It can then be formed by welding the edges by tube making processes well known in the art, to form a tube 35, such as indicated in FIG. 11B, having an outer diameter of 0.5 inch and an inner channel 35, say, 0.340 inch in diameter, and containing discrete islands 36 of superconductive matrix materials, including german silver barrier layers, as previously described. This tube structure may be reduced by the usual cold working techniques to an annular element of the form shown in FIG. 11C having an outer diameter of 0.400 inch.

Figure 12:
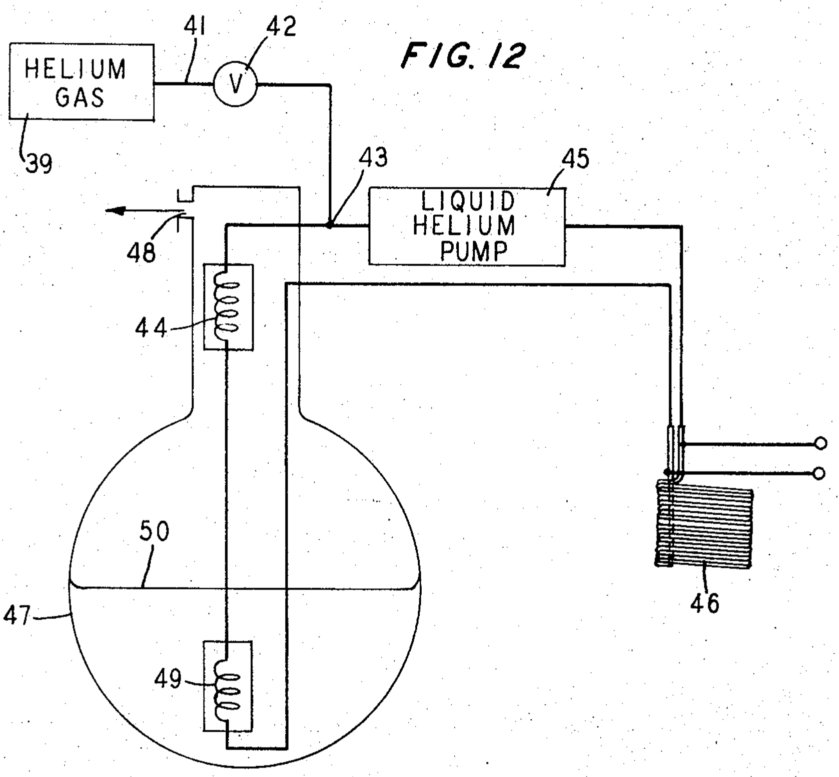
FIG. 12 shows, in schematic, a forced cooling system employing a coil of superconductor wire formed in accordance with the present invention.

It is contemplated that wire formed in accordance with the specifications set forth in FIGS. 11A, 11B, and 11C hereinbefore will be embodied in the coil element 46 of a forced cooling system employing helium, such as shown in FIG. 12 of the drawings. This comprises a Dewar type vessel 47, properly insulated in the manner known in the art to maintain the helium at the desired temperature and pressure. Vessel 47 is more than half filled with a bath of liquid helium 50. Helium gas is initially introduced into the system from a source 39 through the line 41 and cryogenic valve 42 to the junction 43, from which it flows through the heat exchanger 44 interposed in the neck of the vessel, and heat exchanger 49, submersed in liquid helium, to coil 46 comprising hollow superconductive wire of the type described with reference to FIGS. 11A, B and C. The helium circulated through this circuit by the action of the liquid helium pump 45 is brought to a temperature of 4.2° Kelvin in the heat exchanger 49, subsequently cooling down the superconductive coil 46. The heat exchanger 44 functions to partly recuperate the enthalpy of helium vapors exhausted through vent 48 in the top of the vessel. Helium in the closed loop including heat exchangers 44 and 49 and coil 46 is maintained at high pressure, whereas pump 45 is required to produce only a small pressure drop for recirculation in the circuit. Until equilibrium is reached, helium is introduced continuously from the source 39, valve 42 being closed when equilibrium is reached. Details of such a system are disclosed in an article entitled "Construction of a Superconducting Test Coil Cooled by Helium Forced Circulation" by M. Morpurgo of Cern, Geneva, Switzerland, reprinted from N.P. Division Report CERN 68–17 (1968). The test coil 46 may, for example, have the overall form indicated in the above-named article.

It will be apparent that wire formed in the manner indi-cated with reference to FIGS. 1–10 of the present invention can be employed in a high field superconducting magnet of the general type disclosed, for example, in U.S. Pat. No. 3,281,736 to J. E. Kunsler and B.T. Matthias, issued Oct. 26, 1966.

The superconducting strands formed in accordance with the present invention may be expected to have a current carrying capacity of at least about $1 \times 10^5$ amps/cm$^2$ at a field of 60 kilagauss.

It will be understood that although several specific embodiments have been disclosed herein as illustrative examples of the present invention, the latter is not to be construed as limited to the specific forms or dimensions disclosed. The scope of the invention is limited only as set forth in the appended claims.

WHAT IS CLAIMED IS:

1. An electrical conducting element of superconducting material in combination with a barrier layer of german silver.

2. The combination in accordance with claim 1 comprising type II superconducting material.

3. The combination in accordance with claim 2 wherein said combination has been coreduced by working techniques to sustain a substantial reduction in cross-section.

4. A twisted electrical conductor in accordance with claim 3 having a core element comprising superconducting material at least partially surrounded by a shell of german silver.

5. An electrical conductor in accordance with claim 4 comprising a core element including one or more superconducting strands surrounded by an annular shell of german silver.

6. An electrical conductor in accordance with claim 5 wherein said annular shell of german silver is sandwiched between a pair of layers of low resistivity, normally conducting material.

7. An electrical conductor in accordance with claim 6 wherein said annular shell of german silver is sandwiched between a pair of copper layers.

8. The combination in accordance with claim 5 wherein a layer of low resistivity, normally conducting material is interposed between each said strand and said annular shell of german silver.

9. The combination in accordance with claim 8 wherein said layer of low resistivity, normally conducting material consists essentially of copper.

10. An electrical conductor in accordance with claim 4 wherein the pitch at which said electrical conductor is twisted is substantially less than the length $l_c$, where $l_c$ is defined by the formula:

$$l_c \cong 10^8 \lambda J_c d \rho / \dot{H}$$

where:

$\lambda$ is a space factor, less than unity;

$J_c$ is current density in A/m$^2$.;

$d$ is the thickness of the superconducting strands in centimeters;

$\rho$ is the matrix resistivity in ohms/cm.; and $\dot{H}$ = dH/dt rate of rise of field strength in gauss/sec.

11. A body in accordance with claim 2 comprising a matrix of low resistivity, normally conducting material including a series of embedded superconducting wires, and laminae of german silver interposed in said matrix between one or more groups of said wires, and extended in the direction of extent of said wires.

12. The combination in accordance with claim 11 wherein said matrix including said superconducting wires and said german silver laminae have been coreduced by working techniques to sustain a substantial reduction in cross-section.

13. The combination in accordance with claim 11 wherein said normally conducting material is copper.

14. A tubular conductor in accordance with claim 2 comprising a tube of low resistivity, normally conducting material, a plurality of superconducting wires interposed in the wall of said tube extending in a direction substantially parallel to the axis of said tube and arranged in spaced relation around the edge of said tube in a plane perpendicular to said axis, wherein at least a portion of said wires include german silver barrier shells.

15. The combination in accordance with claim 14 wherein said superconducting wires comprise a matrix of normal and superconducting wires which has been prereduced, and wherein said tubular conductor has been reduced through at least one additional step to a substantially reduced cross-section.

16. A cryogenic system including an electrical conducting element in accordance with claim 2, a source of power connected to said conducting element, and means for reducing the temperature of said element to below the critical temperature of said superconducting material.

17. A cryogenic system in accordance with claim 16 having a core element comprising superconducting material at least partially surrounded by a shell of german silver.

18. A cryogenic system in accordance with claim 16 comprising a core element of one or more superconducting strands surrounded by an annular shell of german silver.

19. A cryogenic system in accordance with claim 16 comprising an electrical conductor surrounded by a shell of german silver sandwiched between a pair of layers of low resistivity, normally conducting material.

20. A cryogenic system in accordance with claim 19 wherein said electrical conductor is twisted.

21. A cryogenic system in accordance with claim 16 wherein said conducting element comprises a matrix of normally conducting material including a series of embedded super-conducting strands, and laminae of german silver interposed in said matrix between one or more groups of said strands, and extended in the direction of extent of said strands.

22. The combination in accordance with claim 21 wherein said conducting element is twisted.

23. A cryogenic system in accordance with claim 16 wherein said conducting element comprises a tubular conductor comprising an annular matrix of low resistivity, normally conducting material, a plurality of superconducting wires interposed in said matrix in a direction substantially parallel to the axis of said tube and arranged in spaced relation in said annular matrix in a plane perpendicular to said axis, wherein at least a portion of said wires include a german silver barrier shell, and are twisted.

* * * * *